United States Patent [19]

Sugita et al.

[11] Patent Number: 5,570,205
[45] Date of Patent: Oct. 29, 1996

[54] FACSIMILE APPARATUS HAVING A COMMON CARRIER PATH FOR AN ORIGINAL SHEET AND A RECORDING SHEET

[75] Inventors: Yasutoshi Sugita, Tokyo; Kiyoharu Yoshioka, Yokohama; Yoshiaki Nakashima, Kawasaki, all of Japan

[73] Assignee: Canon Kabushiki Kaisha, Tokyo, Japan

[21] Appl. No.: 269,625

[22] Filed: Jul. 1, 1994

Related U.S. Application Data

[63] Continuation of Ser. No. 765,003, Sep. 24, 1991, abandoned.

[30] Foreign Application Priority Data

Sep. 28, 1990 [JP] Japan ................................ 2-262444

[51] Int. Cl.$^6$ .............................................. H04N 1/024
[52] U.S. Cl. .............................. 35.8/472; 358/49.6
[58] Field of Search ............................ 358/400, 401, 358/488, 494, 496, 497, 498, 472, 486, 317, 321

[56] References Cited

U.S. PATENT DOCUMENTS

| | | | |
|---|---|---|---|
| 4,419,697 | 12/1983 | Wada | 358/257 |
| 4,496,984 | 1/1985 | Stoffel | 358/498 |
| 4,768,100 | 8/1988 | Kunishima et al. | 358/498 |
| 4,953,037 | 8/1990 | Ito et al. | 358/496 |
| 5,162,916 | 11/1992 | Stemanle et al. | 358/472 |

FOREIGN PATENT DOCUMENTS

| | | | |
|---|---|---|---|
| 56-086584 | 7/1981 | Japan | H04N 1/42 |
| 58-29262 | 2/1983 | Japan | H04N 1/02 |
| 58-197954 | 11/1983 | Japan | H04N 1/02 |
| 63-230352 | 9/1988 | Japan | B41J 3/04 |

OTHER PUBLICATIONS

Japanese Patent Abstract, vol. 5, No. 153 (E–75) (825) Sep. 26, 1981.
Japanese Patent Abstract, vol. 8, No. 39 (E–228) (1476) Feb. 21, 1984.
Japanese Patent Abstract, vol. 13, No. 20 (M–785) Jan. 18, 1989.
"Flash Mail", Xerox Disclosure Journal, vol. 13, No. 4, p. 193, Jul./Aug. 1988.

*Primary Examiner*—Edward L. Coles, Sr.
*Assistant Examiner*—Jerome Grant, II
*Attorney, Agent, or Firm*—Fitzpatrick, Cella, Harper & Scinto

[57] ABSTRACT

A facsimile apparatus includes a sheet carrier path adapted to serve dually as (i) an original sheet carrier path for conveying an original sheet, and (ii) a recording sheet carrier path for conveying a recording sheet. Driving rollers convey a sheet inserted into the sheet carrier path, the inserted sheet being at least one of an original sheet and a recording sheet. A reading device, disposed at a reading position in the sheet carrier path, reads the inserted sheet when the sheet has been conveyed by the driving rollers to the reading position. A printing device, disposed at a printing position in the sheet carrier path, prints (e.g., a confirmation) on the inserted sheet when the sheet has been conveyed by the driving rollers to the printing position. A detecting device detects a presence of the inserted sheet in the sheet carrier path, and a selecting device selects at least one of a transmitting mode and a receiving mode. A control device controls each of the reading device and the printing device in response to a detection by the detecting device that the inserted sheet is present in the sheet carrier path such that (i) when the selecting device selects the transmitting mode, the control device controls the reading device to read the inserted sheet, and (ii) when the selecting device selects the receiving mode, the control device controls the printing device to print the inserted sheet.

14 Claims, 8 Drawing Sheets

FACSIMILE APPARATUS HAVING A COMMON CARRIER PATH FOR AN ORIGINAL SHEET AND A RECORDING SHEET

This application is a continuation of application Ser. No. 07/765,003 filed Sep. 24, 1991, which is now abandoned.

BACKGROUND OF THE INVENTION

1. Field of the Invention

The present invention relates to a facsimile apparatus which is miniaturized and which has a carrier path used commonly for each of an original sheet and a recording sheet.

2. Description of the Related Art

Recently, the facsimile apparatus has occupied an important position in the field of the electronic office equipment, and there has been a demand for its miniaturization as well as a reduction in cost.

In a conventional facsimile apparatus, the carrier paths for the original sheet and recording sheet are formed as shown in U.S. Pat. No. 4,768,100.

This carrier path for the original sheet and the carrier path for the recording sheet is extracted and shown in FIG. 11. Now, the description will be made of the carrier path 2 for the original sheet 1 and the carrier path 4 for the recording sheet 3 shown in FIG. 11.

The original sheet 1 is inserted into the carrier path 2 for the original sheet 1 in the direction indicated by arrow M, and when a detecting sensor $S_1$ detects the presence of the original sheet 1, driving rollers 5, 6, and 7 are driven together with the free rollers $5_1$ and $7_1$ in the rotational directions indicated by arrows, respectively. Then, when the leading end of the original sheet 1 is conveyed to the position of a registration sensor $S_2$ to be detected by the sensor $S_2$, the driving circuit of a read sensor R is actuated after a predetermined period of time allow the original sheet 1 to arrive at the reading position of the sensor R. Then, the reading operation begins. When the reading by the read sensor R is terminated, the original sheet 1 is exhausted by carrier rollers 7 and $7_1$.

Usually, when the transmission has been completed subsequent to the termination of the reading of the original sheet 1, its communication report is outputted. This communication report outputs data including the telephone number of the party who has received the communication, the time to start the communication, the communication time, and the communication sheet numbers. This communication report is recorded on a rolled recording sheet 3 by a thermal head F, and this rolled recording sheet 3 is conveyed in the carrier path 4 by a carrier roller 8 which also functions as a platen.

However, since the communication report is recorded on the rolled recording sheet 3, it is necessary to use the rolled recording sheet 3 for each transmission. Therefore, while the cost becomes high, the rolled recording sheet 3 must always be kept in the facsimile apparatus thus making the size thereof inevitably large.

SUMMARY OF THE INVENTION

An object of the present invention is to solve the above-mentioned problems and provide a facsimile apparatus which does not require any recording sheet for recording the communication report.

Another object of the present invention is to provide a facsimile apparatus miniaturized with its carrier path used in common for the original sheet and the recording sheet.

Further objects of the present invention will be clear from the specific embodiments set forth below.

DETAILED DESCRIPTION OF THE PREFERRED EMBODIMENTS

Hereinafter, an embodiment of the present invention will be described in reference to the accompanying drawings.

Figure 1:
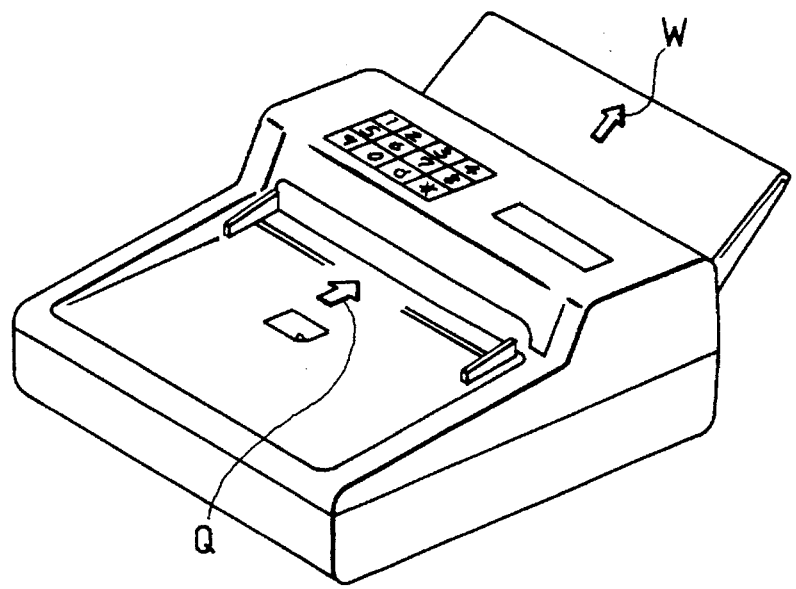
FIG. 1 is a view showing the outer appearance of a facsimile apparatus according to a first embodiment of the present invention.

FIG. 1 shows a facsimile apparatus having a carrier path used dually for the original sheet and recording sheet, in which either an original sheet or a recording sheet is inserted following in the direction of the arrow Q. Then, either the original sheet or recording sheet is exhausted in the direction indicated by arrow W subsequent to a reading operation or a recording operation.

Figure 2:
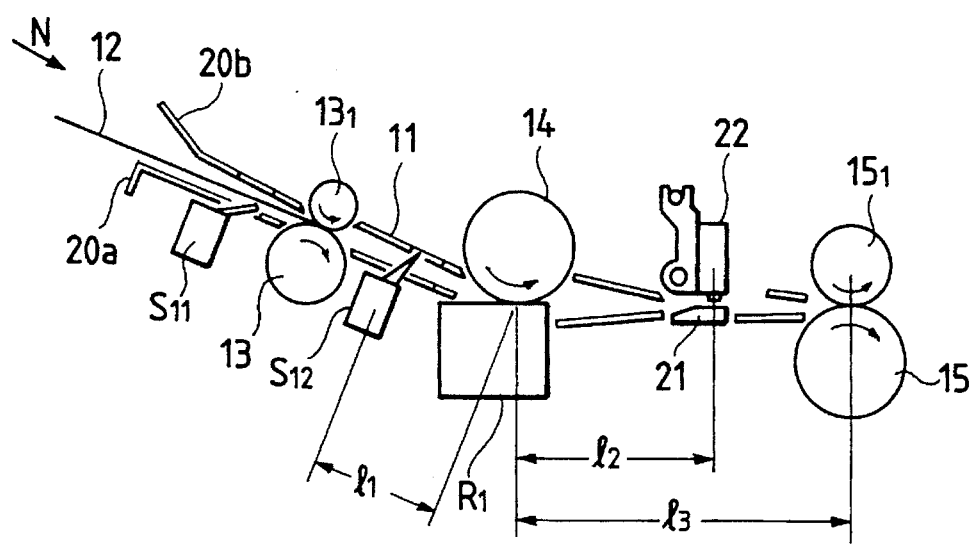
FIG. 2 is a view schematically showing the structure of the carrier path of the facsimile apparatus shown in FIG. 1.

The carrier unit of the facsimile apparatus, which serves to function as its original carrier path and recording sheet path dually, is shown in FIG. 2. In FIG. 2, a reference numeral 11 designates a carrier path for conveying an original sheet 12 (or a recording sheet which is not shown; hereinafter, only the original sheet is described), and in the vicinity of the insertion opening for the sheet 12 of this carrier path 11, a detecting sensor $S_{11}$ is positioned. When this detecting sensor $S_{11}$ detects the presence of the original sheet 12, the driving rollers 13, 14, and 15 which are provided on the carrier path 11 are allowed to rotate together with free rollers $13_1$ and $15_1$ in the directions indicated by arrows. A reference numeral $S_{12}$ is a registration sensor for detecting the leading end of the original sheet 12, and when this sensor $S_{12}$ is actuated, the driving circuit of a read sensor $R_1$ is actuated after a predetermined period of time to allow the leading end of the original sheet 12 to arrive at the reading position of the read sensor $R_1$, thus starting the reading operation.

Figure 3:
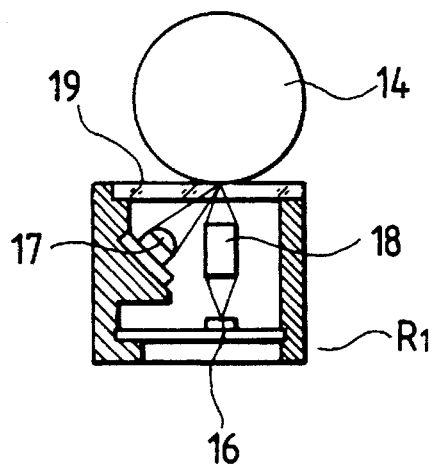
FIG. 3 is a detailed view showing the read sensor shown in FIG. 2.

The read sensor $R_1$ reads the original sheet 12 which is in contact with the reading surface under pressure, and this sensor $R_1$ is structured as shown in FIG. 3. In other words, a reference numeral 16 designates an image sensor array linearly arranged in the width direction of the original sheet for reading through a condensing rod lens array 18 the image information on the original sheet irradiated by an illumination LED array 17. A reference numeral 19 designates a transparent glass plate.

In FIG. 2, reference numerals 20a and 20b designate respectively a lower guide and an upper guide provided to form a carrier path for the original sheet 12.

A reference numeral 22 designates an ink jet printing unit having a printing width in the width direction of the recording sheet arranged between the carrier paths for the original sheet (recording sheet) facing the read sensor $R_1$.

Figure 4:
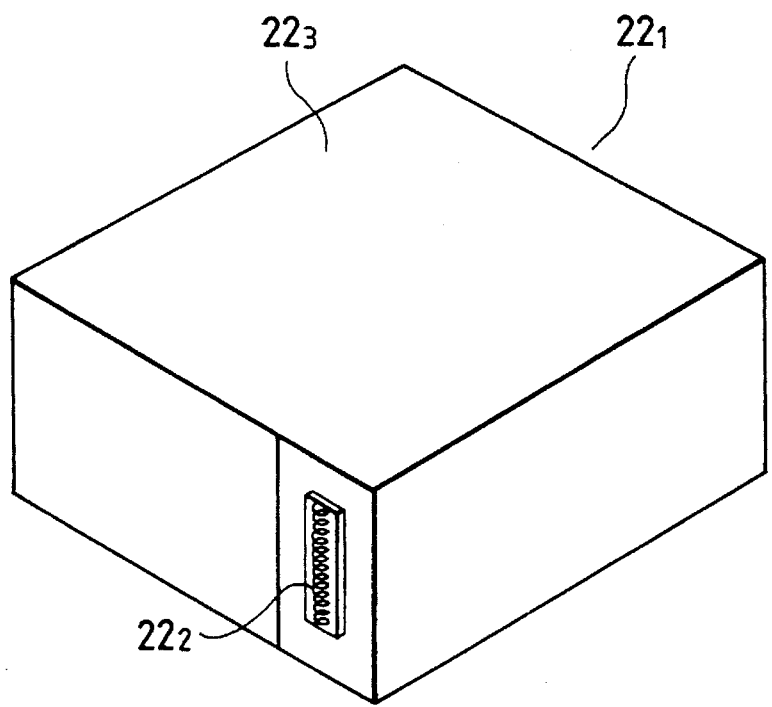
FIG. 4 is a view illustrating the printer head shown in FIG. 2.

This ink jet printer 22 is structured as shown in FIG. 4. In other words, an ink jet cartridge $22_1$, which can be freely mounted, is integrally structured with an ink jet head $22_2$ together with an ink supply tank $22_3$. This ink jet cartridge $22_1$ is configured so that the leading portion of the ink jet head $22_2$ is slightly projected from the front face of the ink tank $22_3$. This ink jet cartridge $22_1$ is of disposable type which can be attached to or detached from the carriage which will be described later.

The ink jet type recording head has an element which generates a thermal energy enabling ink to generate film boiling as an energy utilized for ink discharging.

The ink tank $22_3$ for storing ink to be supplied to the ink jet head $22_2$ comprises an ink absorbent, a container in which this ink absorbent is inserted, and a covering member (all unshown). In this ink tank $22_3$, ink is filled and is supplied to the ink jet head side sequentially as ink is discharged.

Figure 5:
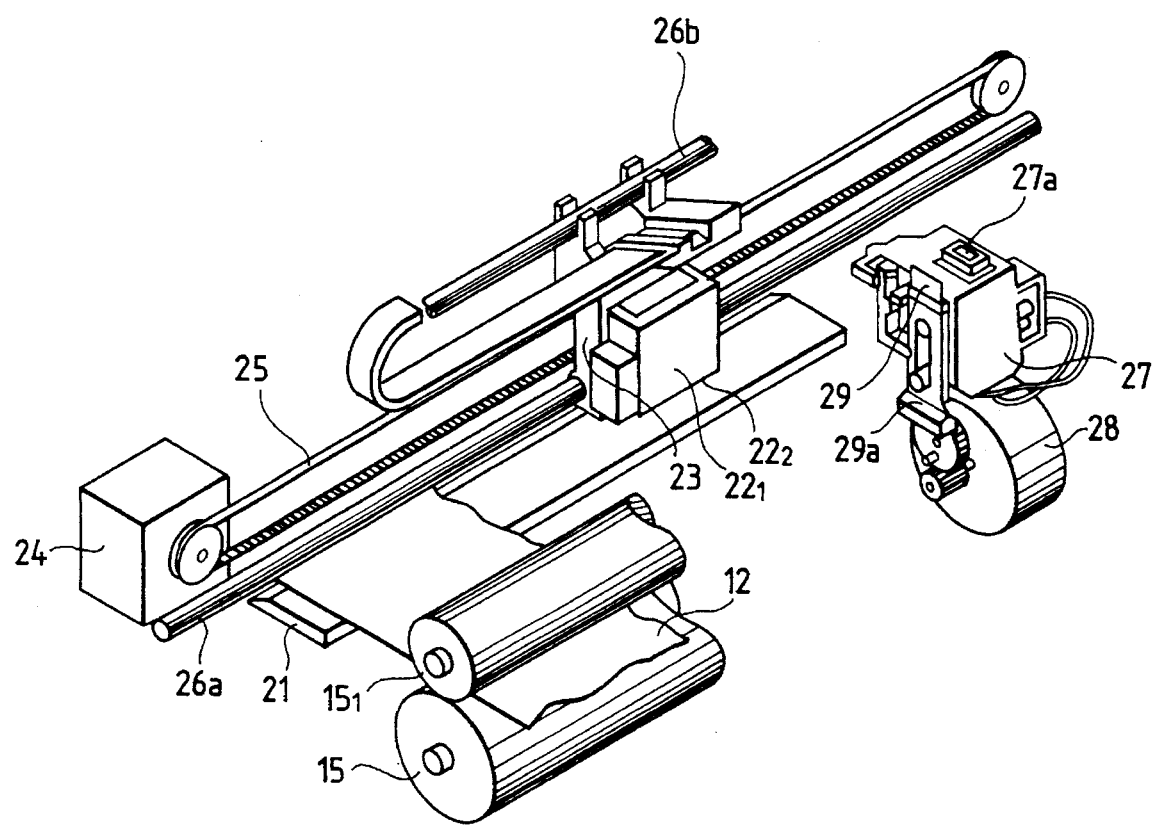
FIG. 5 is a detailed view showing the recording unit shown in FIG. 2.

This ink jet printing unit 22 is mounted on the carriage 23 as shown in FIG. 5, and the head $22_2$ is caused to discharge ink onto the recording surface of a sheet which has been fed onto the platen 21. In FIG. 5, the carriage 23 is coupled to a part of a driving belt 25 for transmitting the driving power of a driving motor 24 and is provided slidably along the two guide shafts 26a and 26b which are arranged in parallel to each other. Hence, the recording head $22_2$ is allowed to shuttle over the entire width of the recording sheet.

A reference numeral 27 designates a head recovery unit and is provided at one end of the traveling pass of the recording head $22_2$ such as a location facing its home position.

The head recovery unit 27 is driven by the driving power of a motor 28 to perform the capping of the recording head $22_2$. In conjunction with the capping of the recording head $22_2$ by the capping portion 27a of this head recovery unit 27, the ink absorption by an appropriate suction means (a suction pump, for example) provided in the head recovery unit 27 or the pressurized ink supply by an appropriate pressuring means provided in the ink supply pass to the recording head $22_2$ is performed thereby to discharge ink forcibly for the execution of the discharging recovery process such as the removal of excessively viscous ink in the discharging port, and the like. Also, the recording head is protected by the capping which is executed when the recording is terminated or some other time as required.

A reference numeral 29 designates a blade formed by silicon rubber, which serves as a wiping member, arranged on the side face of the head recovery unit 27. The blade 29 is supported by a blade supporting member 29a in a cantilever fashion, and as in the case of the head recovery unit 27, the wiping member is driven by the motor 28 to be in contact with the discharging surface of the recording head $22_2$. In this way, on the basis of an appropriate timing with respect to the recording operation of the recording head $22_2$ or subsequent to the discharging recovery process using the head recovery unit 27, the blade 29 is projected into the traveling path of the recording head $22_2$ to wipe off the dewing, wetting, dust particles and the like on the discharging surface of the head $22_2$ following the movement of the head 22.

Figure 6:
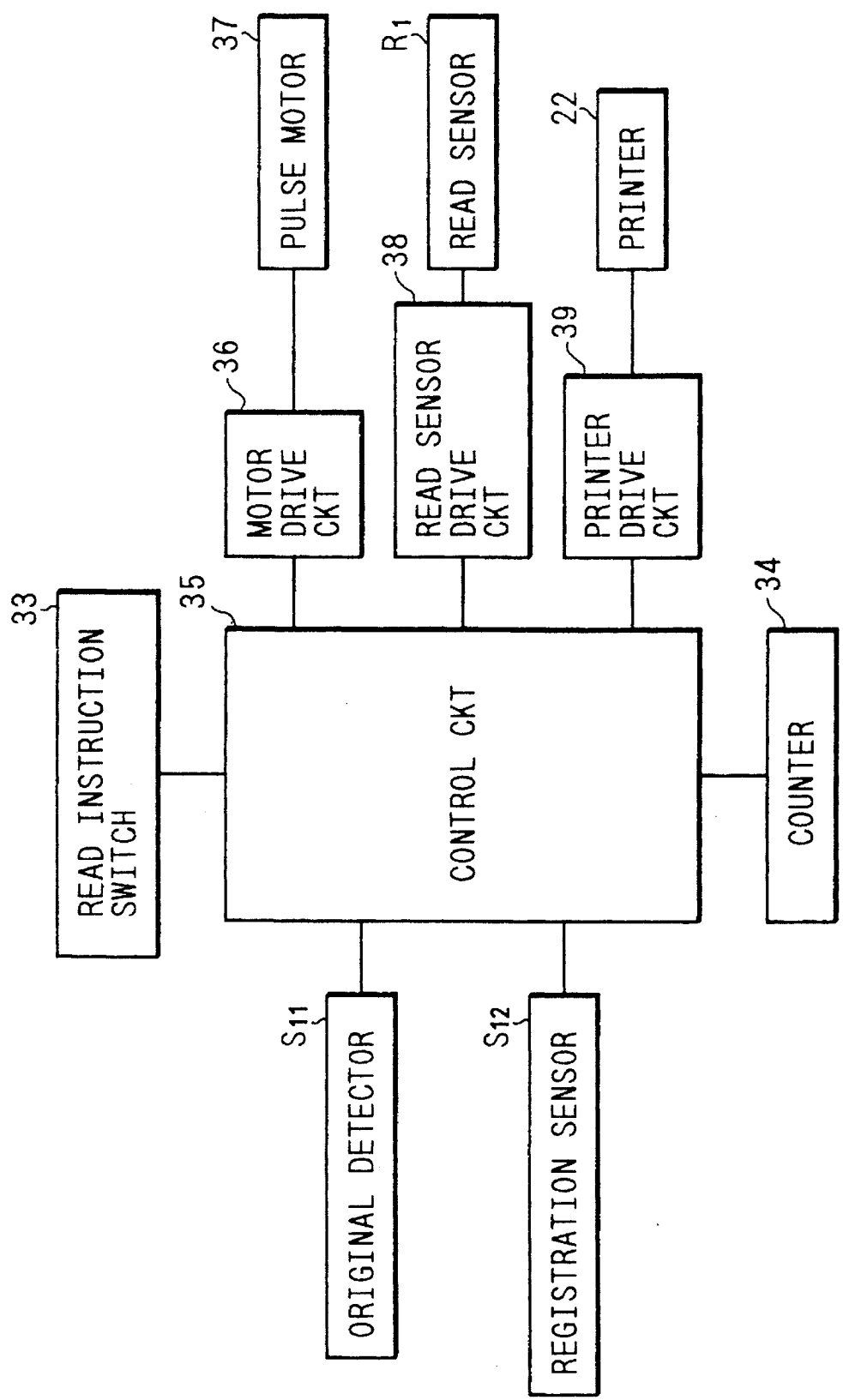
FIG. 6 is a block diagram showing the electric circuit of the facsimile apparatus provided with the carrier unit shown in FIG. 2.

FIG. 6 is a block diagram showing the electric circuit of the apparatus shown in FIG. 1, and each of the output signals from a read instruction switch 33, original detecting sensor $S_2$, registration sensor $S_{12}$, and pulse counter 34 is transmitted to a control circuit 35 formed by a computer.

The control circuit 35 controls the motor drive circuit 36, read sensor drive circuit 38, and printer drive circuit 39 to drive a driving pulse motor 37, read sensor $R_1$, and printer 22, respectively.

Figure 7:
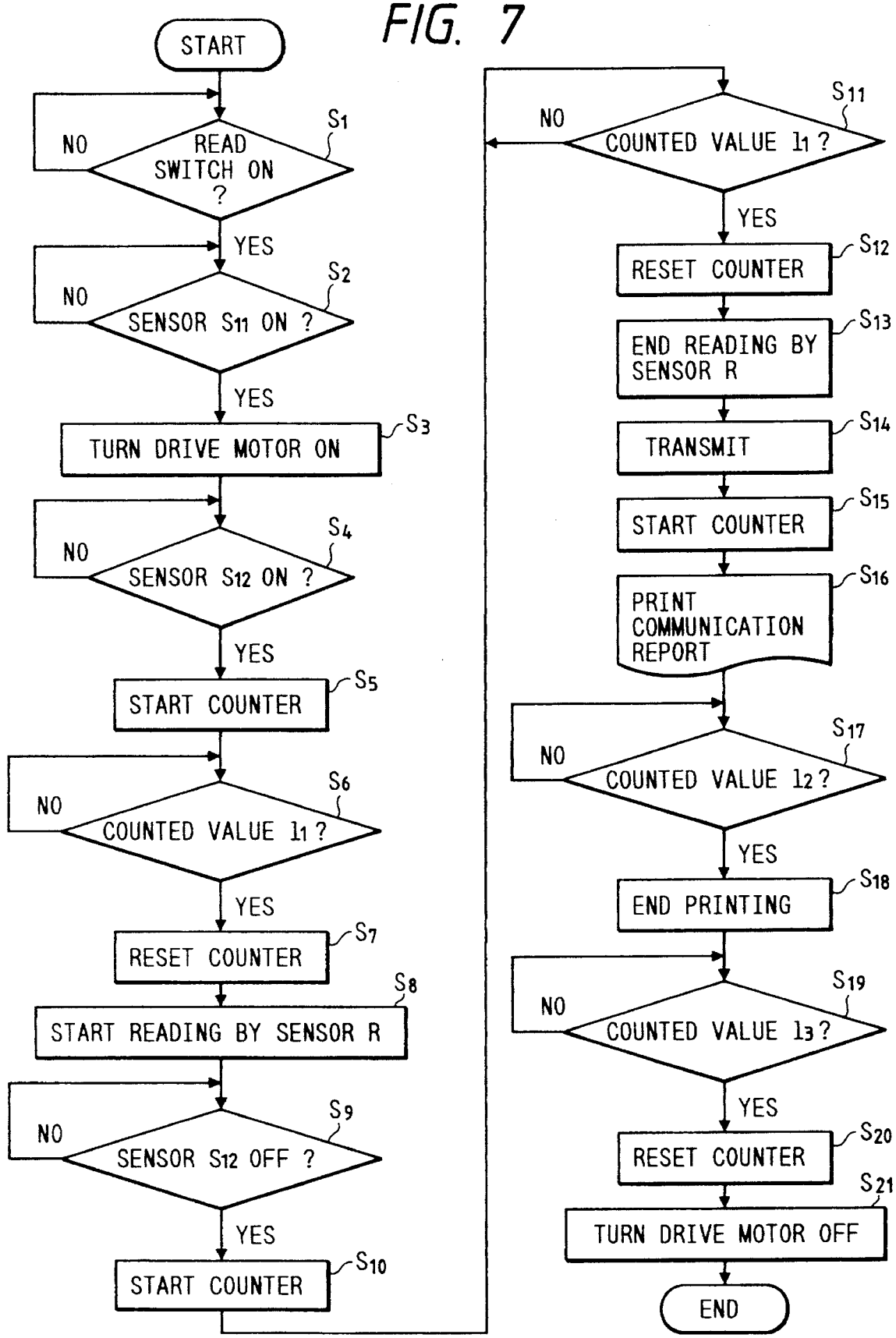
FIG. 7 is a flowchart showing the operation of the electric circuit shown in FIG. 6.
Figure 8:
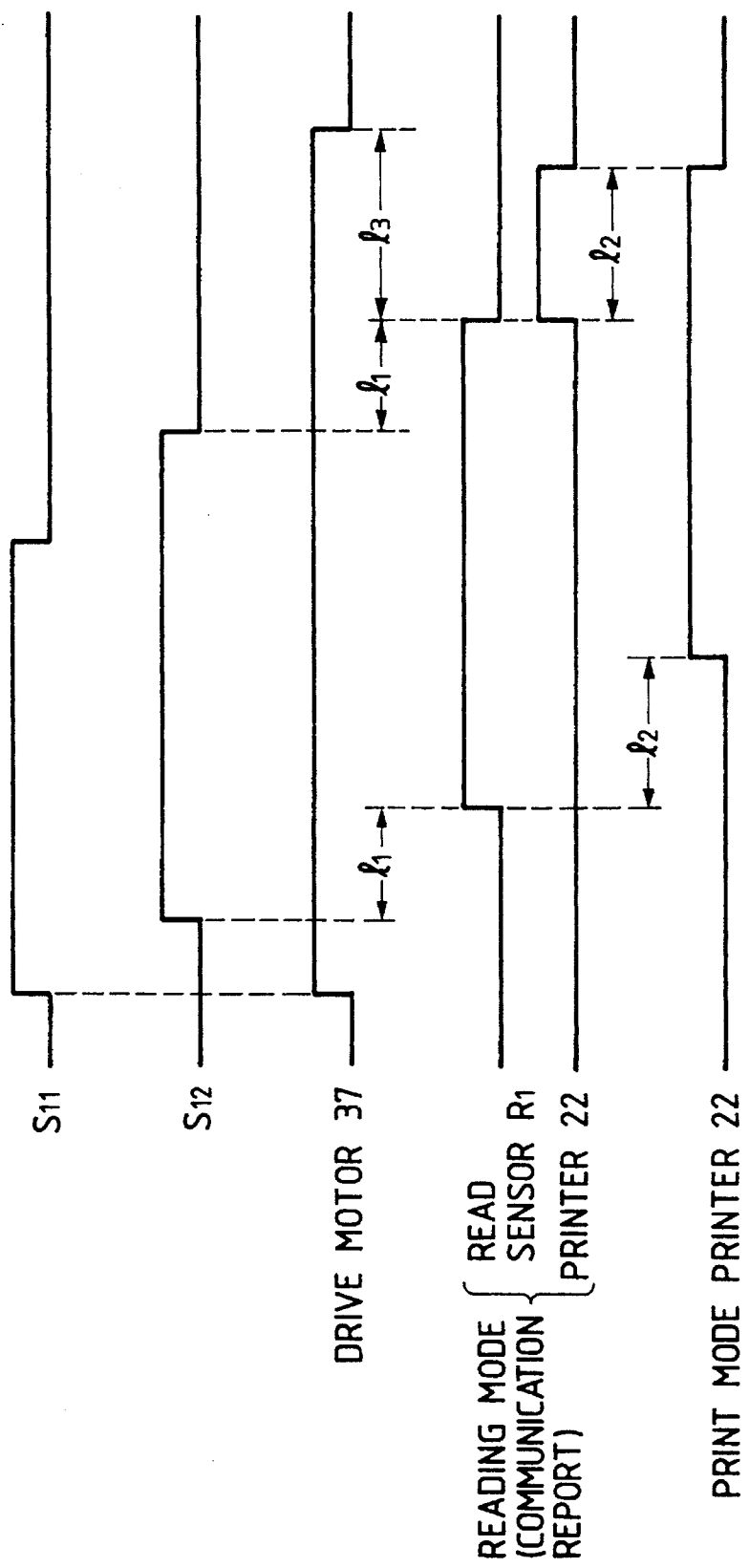
FIG. 8 is a timing chart for the electric circuit shown in FIG. 6.

Here, in conjunction with a flowchart shown in FIG. 7, the description will be made of the operation of the facsimile apparatus shown in FIG. 1 which is provided with the circuit shown in FIG. 6. Further, FIG. 8 is a timing chart of the circuit shown in FIG. 6, in which a reference mark $1_1$ represents the distance for the original sheet to travel from the registration sensor $S_{12}$ to the reading surface of the read sensor $R_1$; $1_2$, the distance for the original sheet to travel from the reading surface of the read sensor $R_1$ to the printing surface of the printer 22; and $1_3$, the distance for the original sheet to travel from the reading surface of the read sensor $R_1$ to the driving roller 15.

Figure 9:
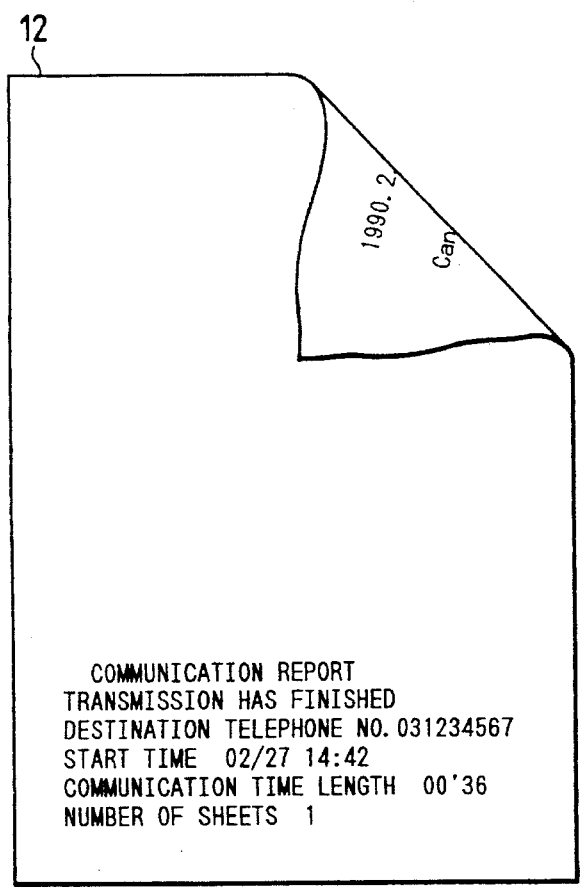
FIG. 9 is a view illustrating the communication report printed on the original sheet shown in FIG. 2.
Figure 11:
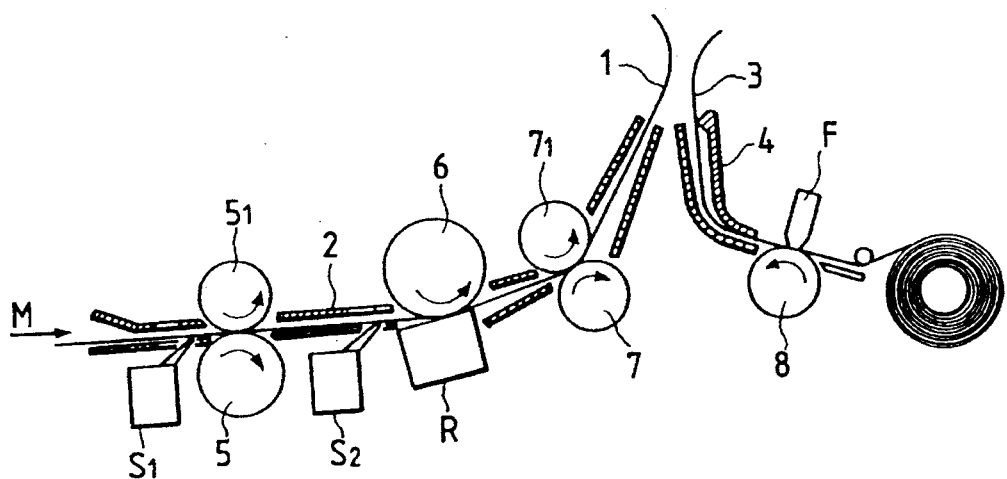
FIG. 11 is a view showing the carrier unit of a conventional facsimile apparatus.

The original read instruction switch 33 is depressed by an operator, and when this turning on of the switch 33 is detected at the step $S_1$ and the presence of the original sheet is detected by the original detecting sensor $S_{11}$ at the step $S_2$, the pulse motor 37 is driven at the step $S_3$. Thus, the driving rollers 13, 14, and 15 are caused to rotate in the directions indicated by arrows together with the free rollers $13_1$ and $15_1$ to convey the original 12, and at the step $S_4$, when the leading end of the original is detected by the registration sensor $S_{12}$, the counter 34 is actuated at the step $S_5$ to count the time required for the leading end of the original sheet 12 to travel the distance $1_1$ from the registration sensor $S_{12}$ to the reading position of the read sensor $R_1$. Then, at the step $S_6$, with the detection of this counting having been executed, the counter 34 is reset at the step $S_7$, and at the step $S_8$, the read sensor drive circuit 38 is driven to enable the read sensor $R_1$ to start reading. When the trailing end of the original sheet 12 is detected by the registration sensor $S_{12}$ at the step $S_9$ subsequent to the reading of this read sensor $R_1$, the counter 34 is actuated at the step $S_{10}$ to count the time required for the trailing end of the original sheet 12 to travel the distance $1_1$ from the registration sensor $S_{12}$ to the reading position of the read sensor $R_1$. Then, when this counting is detected at the step $S_{11}$, the counter 34 is reset at the step $S_{12}$ to stop the driving of the read sensor drive circuit 38 at the step $S_{13}$. Hence, the operation of the read sensor $R_1$ is suspended. Subsequent to the termination of this reading operation, the transmitting operation of the original image thus read is performed at the step $S_{14}$. Then, after the termination of this transmitting operation, the counter 34 is caused to start counting at the step $S_{15}$ and at the same time, the printer drive circuit 39 is driven at the step $S_{16}$ to enable the ink jet printer 22 to print the communication report such as shown in FIG. 9 on the reverse side of the trailing end of the original sheet 12. Then, at the step $S_{17}$, when it is detected that the counter 34 has counted the time required for the trailing end of the original sheet 12 to travel the distance $l_2$ from the reading position of the read sensor $R_1$ to the printing surface of the printer 22, the driving of the printer drive circuit 39 is suspended at the step $S_{18}$ to terminate the printing of the communication report. Then, at the step $S_{19}$ when it is detected that the counter 34 has counted the time required for the trailing end of the original sheet 12 to travel the distance $l_3$ from the reading position of the read sensor $R_1$ to the contacting face between driving roller 15 and free roller $15_1$, the counter 34 is reset at the step $S_{20}$. Then, when the original sheet 12 is exhausted sufficiently, the driving of the motor drive circuit 36 is suspended at the step $S_{21}$ to stop the pulse motor 37, thus terminating the series of the operation.

In the above-mentioned embodiment, although an ink jet printer is used as the printer for outputting an image, type printer is not limited thereto, and a printing apparatus for paper such as a thermal transfer printer may alternatively be used, for example.

Also, in the aforesaid embodiment, a counter is employed to perform the pulse counting of a driving motor for detecting the amount of the original sheet conveyance for subscanning, but the amount of the conveyance for subscanning may be detected using a timer with a predetermined speed at which the original sheet is conveyed.

Figure 10:
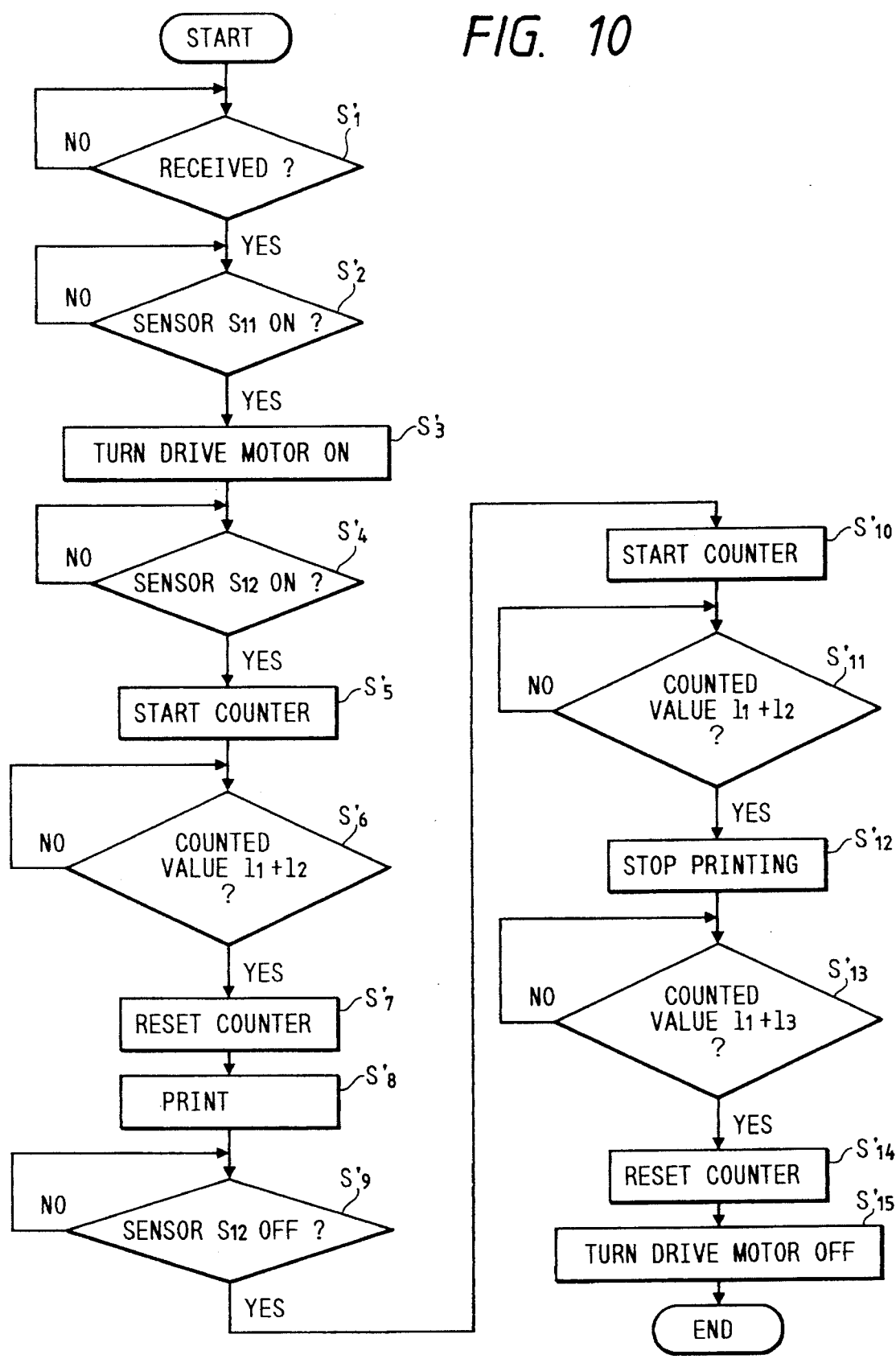
FIG. 10 is a flowchart showing the operation of the electric circuit shown in FIG. 6 at the time of receiving a communication.

So far the operation of sending out information on the original sheet has been described. Now, in conjunction with the flowchart shown in FIG. 10, the description will be made of the operational flow of receiving the information which is being transmitted.

In a state of the receiving mode which is obtainable when the operator has released the on-state of the switch 33, the receiving signal is detected at the step $S'_1$, the presence of the recording sheet is detected by the detecting sensor $S_{11}$ at the step $S'_2$, and the pulse motor 37 is driven at the step $S'_3$. Thus, the driving rollers 13, 14, and 15 are caused to rotate in the directions indicated by arrows together with the free rollers $13_1$ and $15_1$ to convey the recording sheet 12, and at the step $S'_4$, when the leading end of the recording sheet 12 is detected by the registration sensor $S_{12}$, the counter 34 is actuated at the step $S'_5$ to count the time required for the leading end of the recording sheet 12 to travel the distance $l_1+l_2$ from the registration sensor $S_{12}$ to the printing surface of the printing head. Then, at the step $S'_6$, with the detection of this counting having been executed, the counter 34 is reset at the step $S'_7$, and at the step $S'_8$, the printer drive circuit 39 is driven to enable the ink jet head printer 22 to start printing. When the trailing end of the recording sheet 12 is detected by the registration sensor $S_{12}$ at the step $S'_9$ subsequent to recording by the printer the counter 34 is actuated at the step $S'_{10}$ to count the time required for the trailing end of the recording sheet 12 to travel the distance $l_1+l_2$ from the registration sensor $S_{12}$ to the printing surface of the printing head. Then, when this counting by the counter 34 is detected at the step $S'_{11}$, the driving of the printer drive circuit 39 is suspended at the step $S'_{18}$ to terminate printing. Then at the step $S'_{19}$, when it is detected that the counter 34 has counted the time required for the trailing end of the recording sheet 12 to travel the distance $l_1+l_3$ from the registration sensor $S_{12}$ to the contacting face between driving roller 15 and free roller $15_1$, the counter 34 is reset at the step $S'_{20}$. Then when the recording sheet 12 is exhausted sufficiently, the driving of the motor drive circuit 36 is suspended at the step $S'_{21}$ to stop the pulse motor 37, thus terminating the series of the operation.

According to the present invention as set forth above in detail, its structure is arranged so as to use the carrier path in common for the original sheet and recording sheet and at the same time, a reading unit is arranged on the sheet insertion side of the aforesaid sheet carrier path while a recording unit is arranged on the sheet exhaust side of the aforesaid sheet carrier path. Then, the aforesaid sheet reading unit and sheet recording unit are arranged on the side facing each other with the aforesaid sheet carrier path sandwiched between them. Subsequent to having read the original sheet by the aforesaid reading unit, the communication report is printed on the reverse side of the aforesaid original sheet by the aforesaid recording unit. Therefore, there is no need of any recording paper dedicated for the purpose of recording thereby reducing the communication cost. It is also unnecessary to store any recording paper for the communication report in the facsimile apparatus to make miniaturization possible for the apparatus as a whole.

What is claimed is:

1. A facsimile apparatus comprising:

a sheet carrier path adapted to serve dually as (i) an original sheet carrier path for conveying an original sheet, and (ii) a recording sheet carrier path for conveying a recording sheet;

driving rollers for conveying a sheet inserted into said sheet carrier path, the inserted sheet comprising at least one of an original sheet and a recording sheet;

reading means, disposed at a reading position in said sheet carrier path, for reading the inserted sheet when the sheet has been conveyed by said driving rollers to the reading position;

printing means, disposed at a printing position in said sheet carrier path, for printing the inserted sheet when the sheet has been conveyed by said driving rollers to the printing position;

detecting means for detecting a presence of the inserted sheet in said sheet carrier path;

selecting means for selecting at least one of a transmitting mode and a receiving mode; and control means for controlling each of said reading means and said printing means in response to a detection by said detecting means that the inserted sheet is present in said sheet carrier path such that (i) when said selecting means selects the transmitting mode, said control means controls said reading means to read the inserted sheet, and (ii) when said selecting means selects the receiving mode, said control means controls said printing means to print the inserted sheet.

2. A facsimile apparatus comprising:

a sheet carrier path serving dually as (i) a recording sheet carrier path, and (ii) an original sheet carrier path:

driving rollers for conveying and exhausting a sheet inserted into said sheet carrier path:

reading means for reading the inserted sheet if the inserted sheet comprises an original sheet when the inserted sheet is conveyed by said driving rollers to a reading position in said sheet carrier path;

printing means for printing on the inserted sheet when the inserted sheet is conveyed by said driving rollers after passing through the reading position in said sheet carrier path, said printing means being arranged on a side facing said reading means with said sheet carrier path sandwiched between said printing means and said reading means; and control means for controlling the driving of said driving rollers and at the same time, enabling said reading means to read if reading is required., or enabling said printing means to perform printing if printing is required, wherein said control means (i) transmits the contents which have been read subsequent to termination of the reading when the reading of the original sheet is performed by said reading means, and (ii) enables said printing means to print a communication report on a reverse side of the original sheet after the transmission has terminated.

3. A facsimile apparatus according to claim 2, wherein said control means enables said printing means to print (i) after the inserted sheet has passed through the reading position, and (ii) if the inserted sheet comprises a recording sheet.

4. A facsimile apparatus according to claim 2, wherein said printing means comprises a printing head for printing on the recording sheet, said printing head comprising an ink jet recording head.

5. A facsimile apparatus according to claim 4, wherein said ink jet recording head comprises an element for generating thermal energy to cause ink to generate film boiling as energy to be utilized for ink discharging.

6. A facsimile apparatus comprising:

an original sheet carrier path having (i) an original sheet insertion unit for allowing the original sheet to be inserted, and (ii) an original sheet exhaust unit for causing the original sheet to be exhausted;

reading means, provided on the original sheet insertion unit side of said original sheet carrier path, for reading the original sheet;

printing means, provided on the original sheet exhaust unit side of said original sheet carrier path, for printing the original sheet after the original sheet has been read by said reading means, said printing means being provided on a side facing said reading means with said original sheet carrier path sandwiched between said printing means and said reading means, wherein said printing means prints a communication report on a reverse side of the original sheet; and control means for (i) allowing said reading means to transmit, subsequent to termination of reading, the contents of the original sheet which have been read, and (ii) enabling said printing means to print the communication report on the reverse side of the original sheet after the transmission has terminated.

7. A facsimile apparatus according to claim 6, wherein said original sheet carrier path serves dually as a recording sheet carrier path.

8. A facsimile apparatus comprising:

an original sheet carrier path which serves dually as a recording sheet carrier path;

a first detecting means for detecting an original sheet which has been inserted into said original sheet carrier path;

driving rollers for conveying and exhausting the original sheet inserted into said original sheet carrier path, said driving rollers being driven by a detection of the original sheet by said first detecting means;

a second detecting means for detecting the original sheet being conveyed in said original sheet carrier path;

reading means for reading the original sheet conveyed by said driving rollers at a reading position of said original sheet carrier path;

a counter for counting (i) a first time required for the original sheet to be conveyed to the reading position after a detection by said second detecting means, (ii) a second time required for the original sheet to be conveyed to a printing position from the reading position, and (iii) a third time required for the original sheet to be conveyed to a final roller of said driving rollers from the reading position;

printing means for printing the original sheet conveyed by said driving rollers at the printing position of said original sheet carrier path after the reading of the original sheet by said reading means: and control means for controlling said reading means to start reading after the first time counted by said counter subsequent to a detection of a leading end of the original sheet by said second detecting means, and said reading means to terminate reading after the first time counted by said counter subsequent to a detection of a trailing end of the original sheet by said second detecting means, and for transmitting the contents of the original sheet which have been read subsequent to the termination of reading, and controlling said printing means to start printing after the termination of the transmission, and said printing means to terminate the printing after the second time counted by said counter from the reading position, and for suspending the driving of said driving rollers after the third time counted by said counter from the reading position.

9. A facsimile apparatus comprising:

a sheet carrier path structured to serve dually as an original sheet carrier path and a recording sheet carrier path;

conveying means for conveying a sheet inserted into said sheet carrier path, said conveying means conveying the original sheet and the recording sheet in the same direction;

reading means for reading an original sheet conveyed by said conveying means to a reading position of said sheet carrier path;

printing means for printing a recording sheet conveyed by said conveying means to a printing position of said sheet carrier path;

selecting means for selecting either of a reading mode for facsimile transmission of information or a recording mode for facsimile reception of information; and control means for, when the reading mode is selected by the selecting means, performing a reading operation by said reading means to facsimile transmit read information and, when the recording mode is selected by said selecting means to receive information, performing a printing operation of the received information by said printing means.

10. A facsimile apparatus according to claim 9, wherein said printing means and said reading means face opposite directions and are arranged on opposite sides of said sheet carrier path such that said sheet carrier path is sandwiched between said printing means and said reading means.

11. A facsimile apparatus according to claim 9, wherein the printing position is downstream of the reading position.

12. A facsimile apparatus according to claim 9, wherein said printing means comprises a printing head, said printing head being a serial type ink jet head.

13. A facsimile apparatus according to claim 9, wherein said reading means reads a front side of the inserted sheet, and said printing means prints on a reverse side of the inserted sheet.

14. A facsimile apparatus according to claim 13, wherein said printing means prints a communication report on the reverse side of the inserted sheet.

* * * * *

UNITED STATES PATENT AND TRADEMARK OFFICE
CERTIFICATE OF CORRECTION

PATENT NO. : 5,570,205

DATED : October 29, 1996

INVENTORS : YASUTOSHI SUGITA ET AL.

It is certified that error appears in the above-identified patent and that said Letters Patent is hereby corrected as shown below:

COLUMN 1

Line 19, Delete "the" (second occurrence);
   Line 25, "This" should read --The--;
   Line 26, "is" should read --are--;
   Line 39, "allow" should read --to allow--.

COLUMN 2

Line 45, "Delete "following".

COLUMN 4

Line 13, "$S_2$," should read --$S_{11}$,--.

COLUMN 5

Line 16, "printer" should read --of printer--;
   Line 50, "printer the" should read --printer, the--.

UNITED STATES PATENT AND TRADEMARK OFFICE
CERTIFICATE OF CORRECTION

PATENT NO. : 5,570,205

DATED : October 29, 1996

INVENTORS : YASUTOSHI SUGITA ET AL.

It is certified that error appears in the above-identified patent and that said Letters Patent is hereby corrected as shown below:

<u>COLUMN 6</u>

```
Line 67, "required.," should read --required,--.
```

Signed and Sealed this

Twenty-second Day of April, 1997

Attest:

BRUCE LEHMAN

Attesting Officer

*Commissioner of Patents and Trademarks*